United States Patent
Mackin et al.

(10) Patent No.: US 7,974,757 B2
(45) Date of Patent: Jul. 5, 2011

(54) AGRICULTURAL HARVESTER WITH DUAL ENGINE FAILURE POWER TRANSFER SYSTEM

(75) Inventors: Ryan P. Mackin, Milan, IL (US); Alan D. Sheidler, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/470,793

(22) Filed: May 22, 2009

(65) Prior Publication Data
US 2010/0293913 A1 Nov. 25, 2010

(51) Int. Cl.
*G06F 7/70* (2006.01)
(52) U.S. Cl. .................... 701/50; 123/479; 417/212
(58) Field of Classification Search ............... 290/40 A, 290/4 C, 1 A, 1 R, 45, 40 C; 123/41.01, 123/479, 406.54, 460.53; 60/698, 716; 180/65, 180/21, 65.23, 53.8, 65.27; 417/212, 286; 460/6; 56/10.7, 10.2 R; 701/50, 207, 213, 701/208, 52, 65, 68
See application file for complete search history.

(56) References Cited

U.S. PATENT DOCUMENTS

| | | | | |
|---|---|---|---|---|
| 5,373,198 A | * | 12/1994 | Lopez Jimenez | 307/68 |
| 5,495,912 A | * | 3/1996 | Gray et al. | 180/165 |
| 5,558,173 A | * | 9/1996 | Sherman | 180/53.8 |
| 5,847,470 A | * | 12/1998 | Mitchell | 290/45 |
| 5,995,895 A | * | 11/1999 | Watt et al. | 701/50 |
| 6,668,549 B2 | * | 12/2003 | Yano et al. | 60/433 |
| 6,860,105 B2 | * | 3/2005 | Yano et al. | 60/487 |
| 7,013,646 B1 | * | 3/2006 | Serkh et al. | 60/698 |
| 7,648,413 B2 | * | 1/2010 | Duquesne et al. | 460/112 |
| 7,699,039 B2 | * | 4/2010 | Carlsson et al. | 123/406.53 |
| 7,788,889 B2 | * | 9/2010 | Sheidler | 56/10.7 |
| 2001/0035014 A1 | * | 11/2001 | Yano et al. | 60/490 |
| 2002/0056993 A1 | * | 5/2002 | Kennedy | 290/1 A |
| 2005/0061561 A1 | * | 3/2005 | Leonardi et al. | 180/65.1 |
| 2005/0129533 A1 | * | 6/2005 | Yano et al. | 417/286 |
| 2006/0086076 A1 | | 4/2006 | Krone et al. | |
| 2007/0130950 A1 | * | 6/2007 | Serkh et al. | 60/698 |
| 2008/0209878 A1 | * | 9/2008 | Farley | 56/10.2 R |
| 2009/0233664 A1 | * | 9/2009 | Sheidler et al. | 460/119 |
| 2009/0233759 A1 | * | 9/2009 | Sheidler et al. | 477/3 |
| 2009/0241499 A1 | * | 10/2009 | Maertens et al. | 56/11.1 |
| 2009/0308036 A1 | | 12/2009 | Sheidler | |

FOREIGN PATENT DOCUMENTS

| | | | |
|---|---|---|---|
| DE | 4340747 C1 | * | 4/1996 |
| EP | 1126086 A1 | * | 8/2001 |
| EP | 1219751 A1 | * | 7/2002 |
| EP | 1571352 A1 | * | 9/2005 |
| JP | 2007290607 A | * | 11/2007 |
| WO | WO 2007043924 A1 | * | 4/2007 |

OTHER PUBLICATIONS

European Search Report, dated Aug. 20, 2010. (5 pages).

* cited by examiner

*Primary Examiner* — Árpád Fábián-Kovács

(57) ABSTRACT

An agricultural harvester includes a first power unit which is couplable with a first primary load. The first primary load includes a threshing system load. A first motor/generator is mechanically coupled with the first power unit. A first clutch is mechanically coupled between the first power unit and the first primary load. A second power unit is couplable with a second primary load. The second primary load includes a propulsion load. A second motor/generator is mechanically coupled with the second power unit and electrically coupled with the first motor/generator. A second clutch is mechanically coupled between the second power unit and the second motor/generator.

10 Claims, 3 Drawing Sheets

AGRICULTURAL HARVESTER WITH DUAL ENGINE FAILURE POWER TRANSFER SYSTEM

FIELD OF THE INVENTION

The present invention relates to agricultural harvesters, and, more particularly, to agricultural harvesters including an internal combustion engine which may be used to drive primary and external loads.

BACKGROUND OF THE INVENTION

A work machine, such as a construction work machine, an agricultural work machine or a forestry work machine, typically includes a power unit in the form of an internal combustion (IC) engine. The IC engine may either be in the form of a compression ignition engine (i.e., diesel engine) or a spark ignition engine (i.e., gasoline engine). For most heavy work machines, the power unit is in the form of a diesel engine having better lugging, pull-down and torque characteristics for associated work operations.

The step load response of an IC engine in transient after a load impact is a feature mostly influenced by the engine displacement, the hardware of the engine (e.g., whether it has a standard turbocharger, a turbocharger with waste gate or variable geometry, etc.), and by the software strategy for driving the air and fuel actuators (e.g., exhaust gas recirculation, turbocharger with variable geometry turbine (VGT), fuel injector configuration, etc.) with respect to the requirements of emissions legislation (e.g., visible smoke, nitrous oxides (NOx), etc.), noise or vibrations. The load impact may be the result of a drivetrain load (e.g., an implement towed behind the work machine) or an external load (i.e., a non-drivetrain load). External loads can be classified as including both parasitic and auxiliary loads. Parasitic loads are non-drivetrain loads placed upon an engine through normal operation of the work machine, without operator intervention (e.g., an engine cooling fan, hydraulic oil cooling circuit pump, etc.). Auxiliary loads are non-drivetrain loads placed upon an engine through selective operator intervention (e.g., an auxiliary hydraulic load such as an unloading auger on a combine, a front end loader, a backhoe attachment, etc.)

Engine systems as a whole react in a linear manner during the application of a transient load. Initially, the load is applied to the drive shaft of the IC engine. The IC engine speed decreases when the load increases. The engine speed drop is influenced by whether the governor is isochronous or has a speed droop. The air flow is increased to provide additional air to the IC engine by modifying the air actuators. A time delay is necessary to achieve the new air flow set point. The fuel injection quantity, which is nearly immediate, is increased with respect to both the smoke limit and maximum allowable fuel quantity. The engine then recovers to the engine speed set point. The parameters associated with an engine step load response in transient after a load impact are the speed drop and the time to recover to the engine set point.

An IC engine may be coupled with an infinitely variable transmission (IVT) which provides continuous variable output speed from 0 to maximum in a stepless fashion. An IVT typically includes hydrostatic and mechanical gearing components. The hydrostatic components convert rotating shaft power to hydraulic flow and vice versa. The power flow through an IVT can be through the hydrostatic components only, through the mechanical components only, or through a combination of both depending on the design and output speed.

A work machine including an IC engine coupled with an IVT may exhibit problems to be overcome in two ways: First, sudden loads placed on the drivetrain or vehicle hydraulic functions cause the engine speed to decrease. The response time to change the IVT ratio to reduce engine load once decreased is slower than necessary to prevent substantial engine speed drop and sometimes stall. Second, when an external load is applied to the IC engine, such as when filling the bucket of a front end loader on an IVT vehicle, the operator may command a vehicle speed substantially more than what is capable from the IC engine. Under these conditions the IVT output torque and speed may result in excessive wheel slippage and other undesirable characteristics. Likewise, if an external load from another external function to the transmission is activated, such as hydraulic functions, the external load combined with the transmission output capability may place the engine in an overload condition.

The demands for increased performance and fuel economy will increase significantly for work machines within the next decade. This will be complicated by the implementation of devices to reduce emissions. The increasing size and productivity of work machines is expected to result in power demand higher than will be available from economical single internal combustion engines. This will drive the development of vehicles using very large, heavy and expensive industrial engines. The complexity and cost of such engines may be prohibitive and curtail the implementation of higher capacity machinery.

One method around the problem is to use hybrid electric-IC engine technology with a storage battery to supplement the internal combustion engine with electric power boost. This is expected to work very well, but the electric power boost is only available for relatively short periods of time. The amount of time available for electric boost is determined by the size of the battery. Batteries with enough capacity to provide sustained levels of power boost will of necessity be large, heavy and costly, thus limiting their practicality.

Another advantage with battery boosted hybrids is the ability to operate electrical drives with the IC engine shut down. For example, the HVAC, lights, air compressors, cooling fans, grain tank unloading systems, etc., could be operated without the need to start the IC engine. The length of time these drives can be operated with the engine off is limited, again, by the size of the battery. Batteries large enough to do significant work for extended time periods with the engine off may be too large, heavy and costly to be practical. While such a battery boosted hybrid system may be sufficient to operate external loads (such as auxiliary or parasitic loads) for relatively short periods of time, they are not likely sized to operate larger primary loads such as a threshing system load or propulsion load.

It is possible that under certain operating conditions, such as the failure of one of the engines, it may be desirable to drive the loads normally driven by the failed engine with the other engine. However, if the engines are mechanically coupled to the respective load(s) and generator, then driving the load(s) of the failed engine would also drive the failed engine.

What is needed in the art is an agricultural harvester and corresponding method of operation providing sustained, increased power capability with many of the advantages of electric-IC engine hybrids, while still meeting increasingly stringent emissions requirements.

SUMMARY OF THE INVENTION

The invention in one form is directed to an agricultural harvester, including a first power unit which is couplable with a first primary load. The first primary load includes a threshing system load. A first motor/generator is mechanically coupled with the first power unit. A first clutch is mechanically coupled between the first power unit and the first primary load. A second power unit is couplable with a second primary load. The second primary load includes a propulsion load. A second motor/generator is mechanically coupled with the second power unit and electrically coupled with the first motor/generator. A second clutch is mechanically coupled between the second power unit and the second motor/generator.

The invention in another form is directed to a method of operating an agricultural harvester, including the steps of: driving a threshing system load with a first power unit; driving a propulsion load with a second power unit, the second power unit being mechanically independent from the first power unit; driving a first motor/generator with the first power unit; driving a second motor/generator with the second power unit; detecting a failure state of the first power unit and/or second power unit; and transferring electrical power between the first motor/generator and the second motor/generator, dependent upon an occurrence of the failure state.

DETAILED DESCRIPTION OF THE INVENTION

Figure 1:
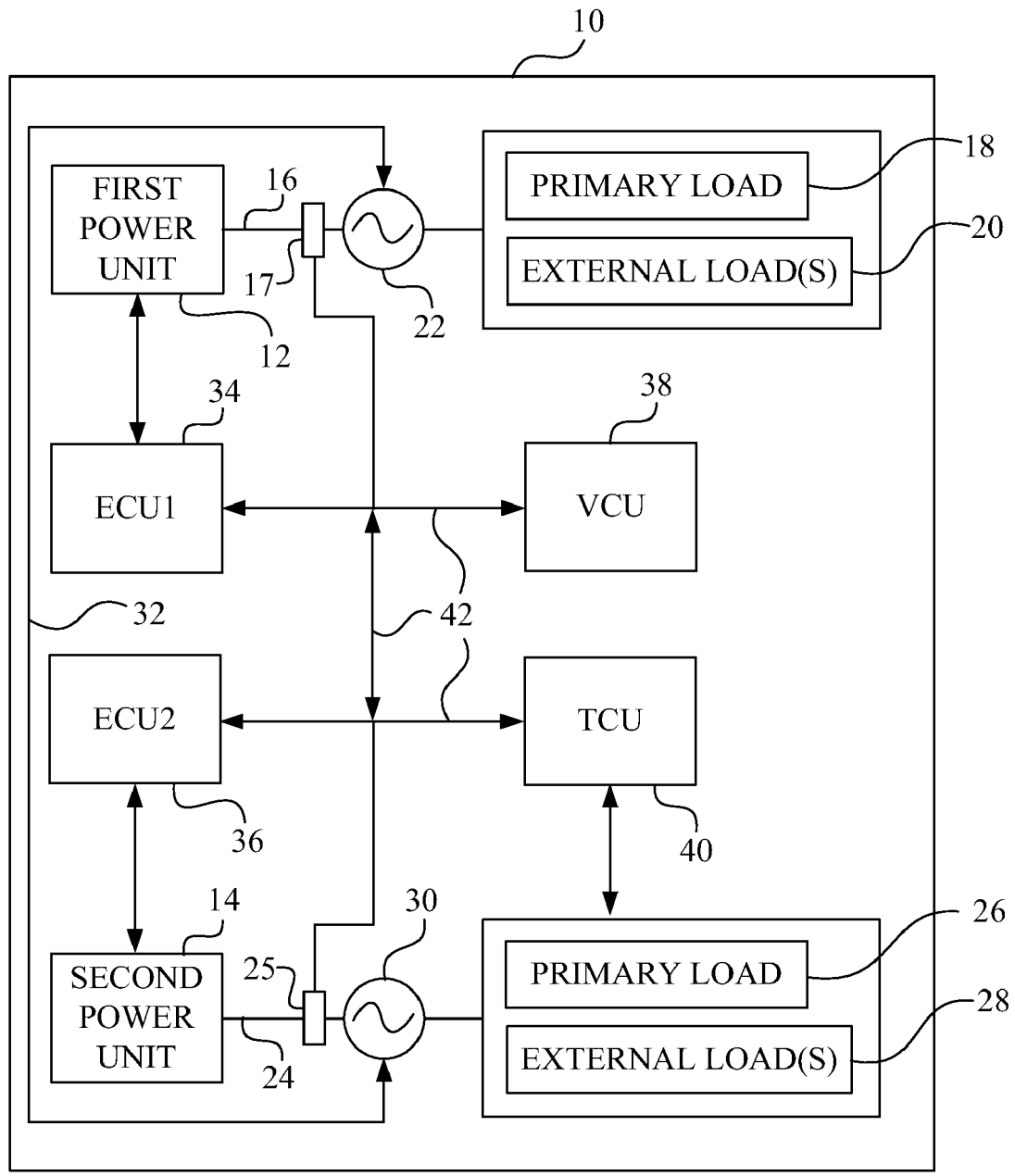
FIG. 1 is a schematic illustration of an embodiment of an agricultural harvester of the present invention.

Referring now to FIG. 1, there is shown a schematic illustration of an embodiment of an agricultural harvester 10 of the present invention. Agricultural harvester 10 is assumed to be a John Deere agricultural combine, but could be a different type of agricultural harvester.

Agricultural harvester 10 includes a first power unit in the form on a first IC engine 12, and a second power unit in the form of a second IC engine 14. First IC engine 12 has a first drivetrain, typically including an output crankshaft 16 and selectively engageable clutch 17, with a first rated output which drives a first primary load 18, and optionally one or more external loads 20. First primary load 18 is a threshing system load associated with one or more of the following: a cutting platform; a header; a feederhousing; a rotor; a separator; and a residue chopper. First primary load 18 preferably is a drivetrain load which is mechanically driven by first IC engine 12, but can also be electrically driven by a first motor/generator 22.

Second IC engine 14 is mechanically independent from first IC engine 12. Second IC engine 14 has a second drivetrain, typically including an output crankshaft 24 and selectively engageable clutch 25, which drives a second primary load 26, and one or more external loads 28. Second IC engine 14 has a second rated output which is approximately the same as the first rated output of first IC engine 12. In the embodiment shown, first IC engine 12 and second IC engine 14 are each assumed to have a rated output of 250 kW.

Second primary load 26 is a propulsion load for selectively propelling agricultural harvester 10 across the ground. To that end, an IVT in the form of a hydrostatic transmission may be selectively engaged/disengaged with crankshaft 24, and provides motive force to one or more drive wheels. Of course, it will be appreciated that in the case of a track-type work vehicle, crankshaft 24 may be coupled with a ground engaging track. Second primary load 26 preferably is a drivetrain load which is mechanically driven by second IC engine 14, but can also be electrically driven by a second motor/generator 30.

The one or more external loads 28 may include one or more auxiliary loads, and may also include one or more parasitic loads. Auxiliary loads are non-drivetrain hydraulic or electric loads placed upon second IC engine 14 through selective operator intervention (e.g., an auxiliary hydraulic load such as an unloading auger on a combine, a front end loader, a backhoe attachment, etc.) Parasitic loads are non-drivetrain loads placed upon second IC engine 14 through normal operation of the agricultural harvester, without operator intervention (e.g., an electrically driven engine cooling fan associated with first IC engine 12, etc.). The external loads can be powered from individual electric motors powered by second motor/generator 30, or can optionally be powered directly from second motor/generator 30.

In the embodiment shown in FIG. 1, external loads 20 are optional loads that can be placed upon first IC engine 12, and all of the external loads 28 are carried by second IC engine 14. This is because it is anticipated that slug loads carried by first IC engine 12 from the threshing system may be high, and the external loads are thus shifted to second IC engine 14. However, it is possible to split the external loads between first IC engine 12 and second IC engine 14, dependent upon expected loads, size of the IC engines (which could be the same or different), number of external loads, etc.

First IC engine 12 and second IC engine 14 are each assumed to be a diesel engine in the illustrated embodiment, but could also be a gasoline engine, propane engine, etc. IC engines 12 and 14 are sized and configured according to the application.

First motor/generator 22 and second motor/generator 30 are electrically coupled together via power line 32 to pass electrical power back and forth in a bidirectional manner between first motor/generator 22 and second motor/generator 30. When receiving electrical power, the particular motor/generator 22 or 30 is operated as a motor to add mechanical power to the output from a respective IC engine 12 or 14, as will be described in more detail below.

An electrical processing circuit for controlling operation of agricultural harvester 10 generally includes a first engine control unit (ECU) 34, a second ECU 36, a vehicle control unit (VCU) 38, and a transmission control unit (TCU) 40. First ECU 34 electronically controls operation of first IC engine 12, and is coupled with a plurality of sensors (not specifically shown) associated with operation of first IC engine 12. For example, ECU 34 may be coupled with a sensor indicating engine control parameters such as an engine failure, an air flow rate within one or more intake manifolds, engine speed, fueling rate and/or timing, exhaust gas recirculation (EGR) rate, turbocharger blade position, etc. First ECU 34 is electrically coupled with clutch 17 and selectively couples first IC engine 12 with primary load 18 and/or first motor/generator 22. Additionally, ECU 34 may receive output signals from VCU 38 representing vehicle control parameters input by an operator, such as a commanded ground speed (indicated by a position of the gear shift lever and throttle and/or hydrostat lever) or a commanded direction of agricultural harvester 10 (indicated by an angular orientation of the steering wheel).

Similarly, second ECU 36 electronically controls operation of second IC engine 14. ECU 36 operates in a manner similar to ECU 32 described above, and will not be described in further detail. It will also be appreciated that for certain applications, ECU 34 and ECU 36 can be combined into a single controller.

TCU 38 electronically controls operation of the IVT making up second primary load 26, and is typically coupled with a plurality of sensors (not shown) associated with operation of the IVT. ECU 34, ECU 36, VCU 38 and TCU 40 are coupled together via a bus structure providing two-way data flow, such as controller area network (CAN) bus 42.

Although the various electronic components such as ECU 34, ECU 36, VCU 38 and TCU 40 are shown coupled together using wired connections, it should also be understood that wireless connections may be used for certain applications.

Figure 2:
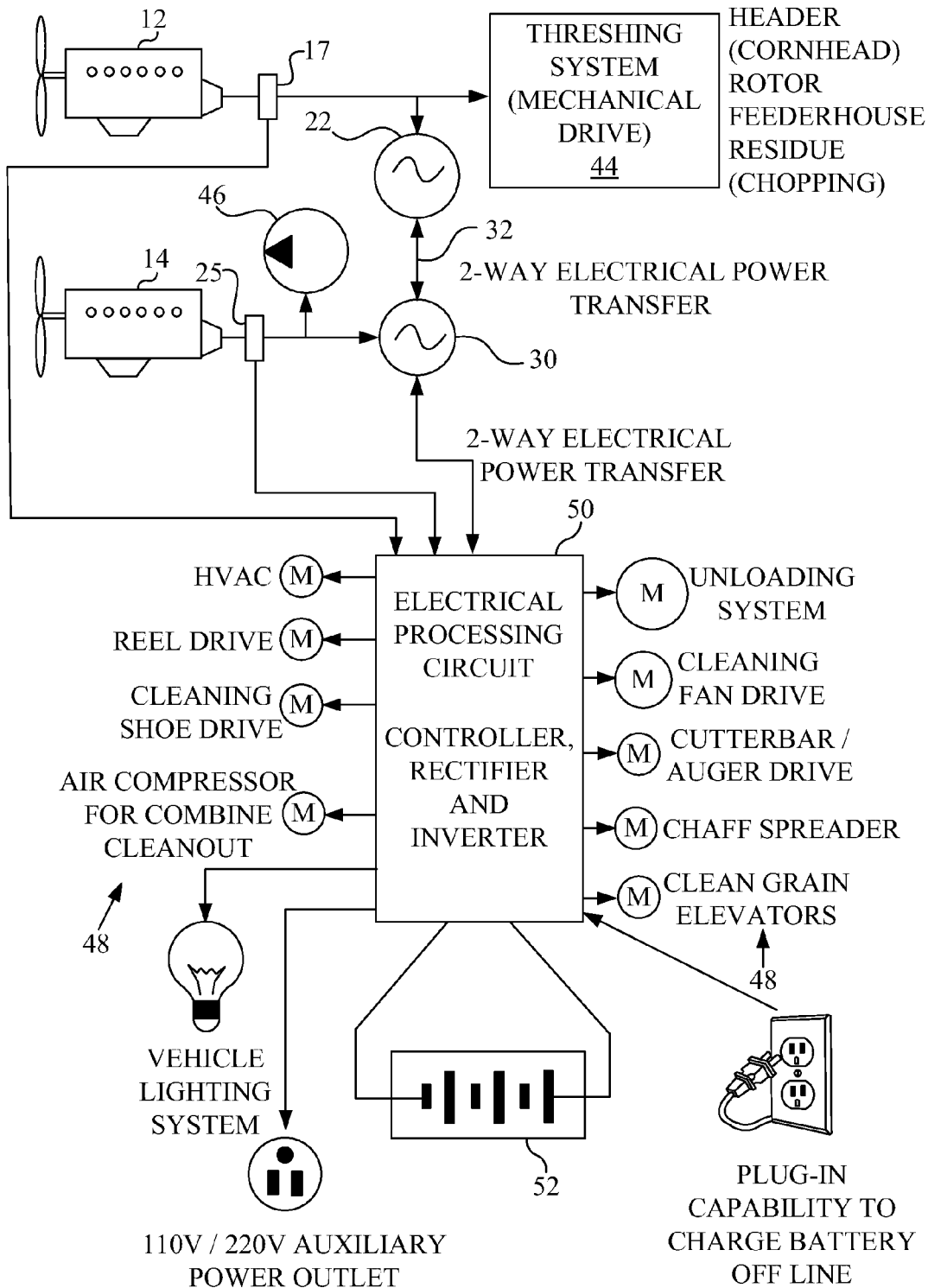
FIG. 2 is a schematic illustration of a particular embodiment of an agricultural harvester of the present invention in the form of an agricultural combine.

Referring now to FIG. 2, a specific embodiment of agricultural harvester 10 of the present invention in the form of an agricultural combine will be described in greater detail. The primary loads driven by first IC engine 12 and second IC engine 14 include two types of drivetrain driven loads. Namely, first IC engine 12 drives a primary load associated with a threshing system 44, and second IC engine 14 drives a primary load associated with a hydrostatic propulsion 46. The threshing system loads are drivetrain loads associated with one or more of the following: a cutting platform; a header; a feederhousing; a rotor; a separator; and a residue chopper.

The external loads driven by second IC engine 14 include two types of non-drivetrain, hydraulic or electrical loads; namely, auxiliary loads commanded by an operator and parasitic loads not commanded by an operator. In the embodiment of FIG. 2, the auxiliary loads 48 are non-drivetrain loads associated with one or more of the following: a heating and air conditioning system; a reel drive; a cleaning shoe drive; an air compressor for cleanout function; a vehicle lighting system; a clean grain unloading system; a cleaning fan drive; a cutterbar/auger drive; a chaff spreader; a clean grain elevator; and an auxiliary electrical power outlet. All of these auxiliary loads 48 (except the lighting system and auxiliary electrical power outlet) are indicated as being electrically driven loads, powered by respective electric motors (each designated "M", but not specifically numbered). The various motors M are selectively energized using an electrical processing circuit 50 (shown schematically in block form), which may include VCU 38, a rectifier and a DC-to-AC inverter. Electrical processing circuit 44 electrically couples second motor/generator 46 with a motor M associated with a selected auxiliary load 48. When providing electrical power to one or more auxiliary loads 48, it will be appreciated that second motor/generator 30 is operated as a motor/generator with an electric power output. The auxiliary loads can also include one or more operator initiated hydraulic loads, not shown.

In the event that second IC engine 14 is not operating and electrical power is required for temporary powering of one or more auxiliary loads 48, an electrical storage battery 52 is also coupled with electrical processing circuit 50. Of course, a bank of batteries can be electrically connected together for a higher amp*hour rating. The power from battery 52 can be applied as DC power, or inverted and applied as AC power.

The auxiliary loads 48 can be hardwired to the electrical processing circuit 50, second motor/generator 30 and/or battery 52, or alternatively may be coupled using modular connectors or plugs (e.g., one or more of the electrical plug-in outlets shown in FIG. 2A). Further, the auxiliary loads 28 may be driven at the same or a different operating speed than the first IC engine 12. This allows the external load functions to be at a different speed than the threshing and propulsion functions, which can be important for certain operating conditions such as tougher crop material when approaching dusk, etc.

First motor/generator 22 and second motor/generator 30 are electrically coupled together, as indicated by electric power line 32. This allows intelligent power management (IPM) by splitting the power needs between first IC engine 12 and second IC engine 14. Electric power can be transferred from first motor/generator 22 to second motor/generator 30, or vice versa, depending upon the power needs associated with primary loads 18 and 26, or auxiliary loads 48.

According to an aspect of the present invention, electrical processing circuit 50 receives various input signals indicating operating parameters of IC engines 12 and 14. Such operating parameters, as indicated above under the discussion of first ECU 34 and second ECU 36, include a failure state of first IC engine 12 and second IC engine 14. Upon occurrence of a detected failure state, electrical processing circuit 50 selectively controls clutch 17 or clutch 25 to disengage the failed engine from the attached load(s), as will be described in more detail below. An engine failure state is any operating state which is deemed critical, and therefore the engine shuts down or is shut down. For example, an engine failure state can be associated with overheating (coolant or combustion air), a mechanical failure, low oil pressure, excess exhaust emissions (e.g., plugged diesel particulate filter), an electronic failure, or an out of fuel condition. Other predefined engine "failure states" are also possible.

Figure 3:
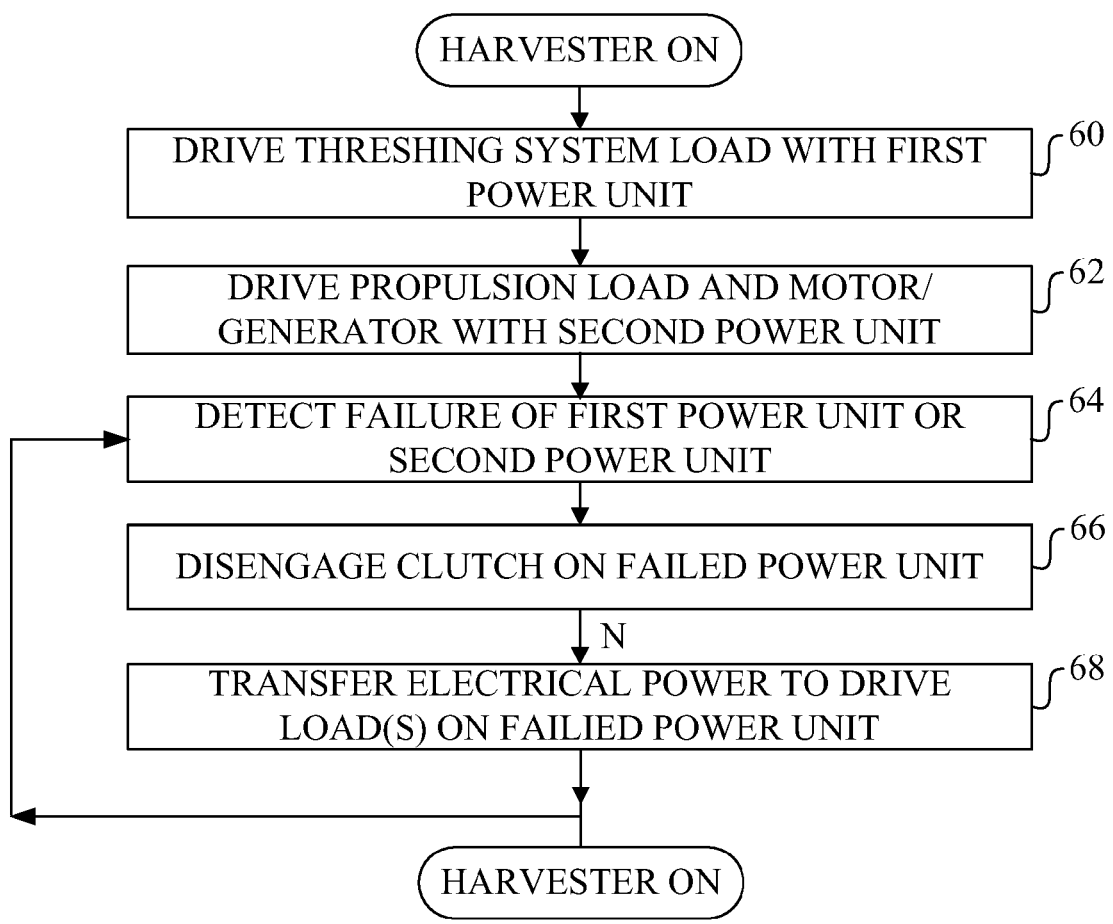
FIG. 3 is an embodiment of a method of operation of the agricultural harvester shown in FIG. 2.

Referring now to FIG. 3, a method of operating agricultural harvester 10 using IPM with first motor/generator 22 and second motor/generator 30 will be described in greater detail. When the harvester 10 is at a field for harvesting operations, first IC engine 12 is used to drive the threshing system and second IC engine 14 is used to drive the propulsion system (blocks 60 and 62). Concurrently, first IC engine 12 is used to drive first motor/generator 22 and second IC engine 14 is used to drive second motor/generator 30. The auxiliary loads 48 which are driven by second motor/generator 30 in turn add to the load placed on second IC engine 14. Upon occurrence of a detected failure state (block 64), electrical processing circuit 50 selectively controls clutch 17 or clutch 25 to disengage the failed engine from the attached load(s)(block 66). To that end, if the failure state corresponds to a failure of first IC engine 12, clutch 17 is disconnected and electrical power is transferred from second motor/generator 30 to first motor/generator 22 to thereby drive the threshing system load(s) 44 (blocks 66 and 68). On the other hand, if the failure state corresponds to a failure of second IC engine 14, clutch 25 is disconnected and electrical power is transferred from first motor/generator 22 to second motor/generator 30 to thereby drive the propulsion load 46 and/or auxiliary load(s) 48 (blocks 66 and 68).

Having described the preferred embodiment, it will become apparent that various modifications can be made without departing from the scope of the invention as defined in the accompanying claims.

The invention claimed is:

1. An agricultural harvester, comprising:
   a first power unit which is couplable with a first primary load, said first primary load including a threshing system load;
   a first motor/generator mechanically coupled with said first power unit;
   a first clutch mechanically coupled between said first power unit and said first primary load;
   a second power unit which is couplable with a second primary load, said second primary load including a propulsion load;

a second motor/generator mechanically coupled with said second power unit and electrically coupled with said first motor/generator;

a second clutch mechanically coupled between said second power unit and said second motor/generator: and a control unit configured to detect a failure status of one of said first power unit and said second power unit, said failure status defining a failed power unit, said control unit being coupled to at least one of said first clutch and said second clutch, said control unit disconnecting said failed power unit by disengaging one of said first clutch and said second clutch which is associated with said failed power unit, said control unit directing electrical power to one of said first motor/generator and said second motor generator which is associated with said failed power unit.

2. The agricultural harvester of claim 1, wherein said first motor/generator and said second motor/generator are bidirectionally electrically coupled together.

3. The agricultural harvester of claim 2, wherein said control unit is configured for selective bidirectional transfer of electrical power between said first motor/generator and said second motor/generator, dependent upon an operating state of at least one of said first motor/generator and said second motor/generator.

4. The agricultural harvester of claim 3, wherein said operating state is a failure of one of said first motor/generator and said second motor/generator.

5. The agricultural harvester of claim 1, wherein said first clutch is mechanically coupled between said first power unit and each of said first primary load and said first motor/generator, and said second clutch is mechanically coupled between said second power unit and each of said second primary load and said second motor/generator.

6. The agricultural harvester of claim 1, wherein said second motor/generator is configured to electrically drive at least one external load.

7. The agricultural harvester of claim 6, wherein each said external load corresponds to one of a parasitic load and an auxiliary load.

8. The agricultural harvester of claim 7, wherein each said parasitic load is a non-drivetrain load without operator intervention, and each said auxiliary load is a non-drivetrain load with operator intervention.

9. The agricultural harvester of claim 7, wherein said agricultural harvester is an agricultural combine, and said at least one auxiliary load corresponds to at least one of:
a heating and air conditioning system;
a reel drive;
a cleaning shoe drive;
an air compressor for cleanout function;
a vehicle lighting system;
a clean grain unloading system;
a cleaning fan drive;
a cutterbar/auger drive;
a chaff spreader;
a clean grain elevator; and
an auxiliary electrical power outlet.

10. The agricultural harvester of claim 1, wherein said first power unit and said second power unit are each an internal combustion (IC) engine.

* * * * *